United States Patent [19]
Brendzel

[11] Patent Number: 5,912,952
[45] Date of Patent: Jun. 15, 1999

[54] VOICE RESPONSE UNIT WITH A VISUAL MENU INTERFACE

[75] Inventor: Henry Tzvi Brendzel, Millburn, N.J.

[73] Assignee: AT&T Corp, Middletown, N.J.

[21] Appl. No.: 08/670,311

[22] Filed: Jun. 27, 1996

[51] Int. Cl.$^6$ .............................................. H04M 11/00
[52] U.S. Cl. ................................... 379/93.25; 379/93.17
[58] Field of Search ........................... 379/96–98, 93, 379/100, 88–90, 67, 52, 201, 207, 93.01, 93.09, 93.17, 93.21, 93.22, 93.25; 348/14–19; 345/353, 356, 357

[56] References Cited

U.S. PATENT DOCUMENTS

| | | | |
|---|---|---|---|
| 4,821,211 | 4/1989 | Torres ...................................... | 345/357 |
| 5,121,421 | 6/1992 | Alheim ...................................... | 379/52 |
| 5,164,982 | 11/1992 | Davis ........................................ | 379/96 |
| 5,365,577 | 11/1994 | Davis et al. .............................. | 379/96 |
| 5,416,831 | 5/1995 | Chewning, III et al. ................. | 379/96 |
| 5,440,585 | 8/1995 | Partridge ................................. | 375/261 |
| 5,448,555 | 9/1995 | Bremer et al. ........................... | 370/20 |
| 5,524,137 | 6/1996 | Rhee ........................................ | 379/67 |
| 5,559,945 | 9/1996 | Beaudet et al. .......................... | 345/353 |
| 5,583,922 | 12/1996 | Davis et al. .............................. | 379/96 |
| 5,621,905 | 4/1997 | Jewson et al. ........................... | 345/353 |
| 5,644,736 | 7/1997 | Healy et al. ............................. | 345/357 |
| 5,644,740 | 7/1997 | Kiuchi ...................................... | 345/357 |

FOREIGN PATENT DOCUMENTS

| | | | |
|---|---|---|---|
| 0774 853 A2 | 10/1996 | European Pat. Off. ......... | H04M 3/50 |
| WO 94/21077 | 3/1993 | WIPO ........................... | H04M 11/06 |
| WO 95/11563 | 10/1994 | WIPO ........................... | H04M 11/08 |
| WO 96/24215 | 1/1996 | WIPO ........................... | H04M 11/00 |
| WO 94/24802 | 4/1996 | WIPO ........................... | H04M 11/00 |

OTHER PUBLICATIONS

P. Rullens, "Voice Manager 800 Giving Data Processing Systems A Voice," Philips Telecommunication Review, vol. 52, No. 4, Oct. 1995, pp. 42–28.

"Voice Augmented Menu Automated Telephone Response System," IBM Technical Disclosure Bulletin, Vo. 38, No. 2, Feb. 1, 1995, pp. 57–61.

Bellcore, "Generic Requirements for an SPCS to Customer Premises Equipment Data Interface for Analog Display Services," TR–NWT–001273, Dec. 1992, pp. 3–1 through 3–26, Appendix E, Appendix F. Cited in application; technological background of the invention.

Primary Examiner—Wing F. Chan
Attorney, Agent, or Firm—Henry T. Brendzel

[57] ABSTRACT

An enhanced response unit that is able to send visual information to the customer as well as voice information, thereby providing the customer with a powerful and satisfying mechanism with which to achieve the desired result. The unit determines whether the CPE calling the unit is capable of interacting with visual information and adjusts its mode of operation accordingly. Because two channels of information are available, various capabilities are easily implemented such as interacting with users in visual mode and in aural mode simultaneously, such as recalling the visual menu process anytime, etc. The improved unit also allows for convenient linking, in response to an appropriate choice made by the customer, to a physically different response unit that provides its own menu.

14 Claims, 3 Drawing Sheets

VOICE RESPONSE UNIT WITH A VISUAL MENU INTERFACE

BACKGROUND OF THE INVENTION

This invention relates to telecommunication equipment and services and, more particularly, to automated response units.

Voice response units (VRUs) are automated response apparatus to which a telecommunication customer can connect to obtain a particular service or to speak to a particular person. The customer is greeted by a sequence of electronically generated prompts that, through the interactive responses from the customer, eventually connect the customer to the desired service or person. Typically, the customer's response signal is a DTMF signal that results from pressing one of the touch tone pad buttons. Some of the more sophisticated VRUs in the network today respond to spoken words that either correspond to the touch tone pad buttons that need to be pressed (e.g., "four") or actually correspond to the meaning of the spoken words (e.g., "collect").

The VRU interaction with the customer is limited, however, because in today's VRUs the method for "signaling" by the VRU (i.e., the prompts sent to the customer) is by means of spoken words, and people have a fairly limited capacity when it comes to hearing, comprehending, remembering and thereafter responding to a set of prompts or instructions. The result is that VRUs typically present customers with very few choices in each of their prompts, relying on a hierarchical approach to the prompts and answers that lead customers to the desired state. For example, a store may choose to have the first question resolve the nature of the customer's business with the store. Hence, the first prompt may be "For questions about a bill, press 1; for questions about our sale, press 2; for questions about a recent purchase, press 3; and if you wish to be directed to a particular department, press 4." Once the first question is answered, the store may wish the customer to advance to the next hierarchical level. For example, "For automotive, press 1; for garden supplies, press 2; for clothing, press 3, and for furniture, press 4."

It is readily apparent that while this mode of interaction is very powerful because it allows the store to electronically (and hence inexpensively) handle fairly complex interactions with customers before a person needs to be involved (if at all), it is often frustrating to customers. The frustration arises from situations where the customer needs to "back up" and cannot, when the prompt is too long or too complex for the customer to comprehend and remember, when the customer is guided through too long a sequence of prompts (and hence too time consuming), when even after going through the long sequence of prompts the choice that the customer wishes to make is not offered in any of the prompts (e.g., the customer wishes to talk to someone in cosmetics, and not in automotive, garden supplies, clothing or furniture, as in the above example), etc.

What is needed is a better interface, and I believe that a visual interface holds such a promise.

In a somewhat different context, Bellcore has introduced a communication protocol that provides for bi-directional transmission of data between a stored program control system (SPCS) and specialized customer premises equipment (that includes a display screen), which Bellcore terms "analog display services customer premises equipment." This protocol, which is commonly referred to as ADSI (for Analog Display Services Interface), is described in Bellcore's publication titled "Generic Requirements for an SPCS to Customer Premises Equipment Data Interface for Analog Display Services," TR-NWT-001273, December 1992. The SPCS is connected, directly or remotely, to the CPE. The remote connection may be via the Public Switched Telephone Network (PSTN). According to the Bellcore-proposed ADSI protocol, the SPCS hosts/servers must meet a number of requirements, and among them are:

The SPCS must be able to generate CPE Alerting Signals (ringing signals);
 The SPCS must be able to provide standard dial tone;
 The SPCS must be able to receive standard DTMF signaling;
 The SPCS must be able to turn off the DTMF receiver; and others.

Those requirements are not compatible with VRUs.

From the above it can be seen that the ADSI protocol aims at providing a limited visual messaging capability to a specialized CPE from a SPCS system that provides the alerting and the dial tone signals to the CPE. PBXs and central offices are such systems. One application for which this capability is apparently aimed is the "voice mail" services that are offered in PBXs or central offices.

A viable extension for VRUs is necessary which provides for interactive operation across the telecommunication network, which eliminates the limitations imposed by the ADSI on the SPCS and CPE equipment, which eliminates the disadvantages of today's VRU-customer interfaces, and which is robust enough to be acceptable to today's telecommunication network.

SUMMARY

The present day limitations of VRUs are overcome by providing a mechanism for enhanced interaction between the VRU and the customer. In accordance with the principles disclosed herein, the VRU becomes a Multimedia Response Unit (MRU) which can signal the customer with more than just voice. In particular, the MRU is able to send visual information to the customer as well as voice information, thereby providing the customer with a powerful and satisfying mechanism with which to achieve the desired result. When interacting with video, the structure of the menu is revealed to the customers; the customer is allowed to see at any one time more than one level of hierarchical menu structures (when the menu has such a structure), is allowed to skip levels, is allowed to back up, is allowed to skip from one "branch" of the tree to another, and can be simultaneously provided with additional information. In embodiments that provide the additional information, it may be imparted through the voice channel or through the video channel, or both. The video channel, for example, can be used to display advertising information in areas that are not used to display the menu. Separate advertising screens between successive menu screens can easily be incorporated.

In accordance with one feature, the MRU is informed of the type of CPE that is connected to the MRU, and the MRU adjusts its mode of operation accordingly. This allows the MRU to interact with all customers regardless of the particular terminal equipment that the customer possesses, which makes the MRU acceptable to today's telecommunication environment.

In accordance with another feature, even after the initial interaction is completed and the party calling the MRU conducts the substantive business that prompted the call in the first instance, the digital channel can continue to be used, and a return to the menu is allowed anytime.

In accordance with still another feature, the hierarchical menu structure allows for convenient linking to a physically different MRU, or VRU, that provides its own menu.

DETAILED DESCRIPTION

In accordance with the principles disclosed herein and explained more fully below by way of an illustrative embodiment, the options or selections presented to customers are in visual form, in aural form, or in both visual and aural form. The enhanced mode of operation (i.e., providing visual information) is possible, however, only in connection with customer terminals that can handle visual information. Recognizing that most present day terminal units are conventional telephones that are limited to aural communication, the MRU embodiment as disclosed herein also offers a voice-only mode of operation as well as the enhanced visual mode of operation. Advantageously, such a system automatically discerns the type of terminal with which it is communicating and thereafter employs the appropriate mode of communication.

Most telephones with a visual display, or screen, merely employ the screen as a means for communicating to the user from other than the party at the other end of the conversation to which the telephone is connected. The communication is sometimes from the terminal itself (such as when the digits dialed by the user are displayed on the screen), from the PBX to which the user is connected (such as providing means for obtaining the extension numbers of other customers connected to the PBX), or from the central office (such as when the caller ID information is provided). In contradistinction, the arrangement disclosed below provides a communication channel from the CPE (e.g., telephone), through the telecommunication network, to the party at the other end. In the context discussed herein, since MRUs are not used for originating calls, the "party at the other end" is the called party. This communication channel may be embedded in the voice band (commingled with voice communication but in a separate logical channel) or it can be realized through a separate channel. For example, when the CPE is ISDN compatible (e.g., an ISDN phone) and the MRU is ISDN compatible, both data and control can be communicated.

Figure 1:
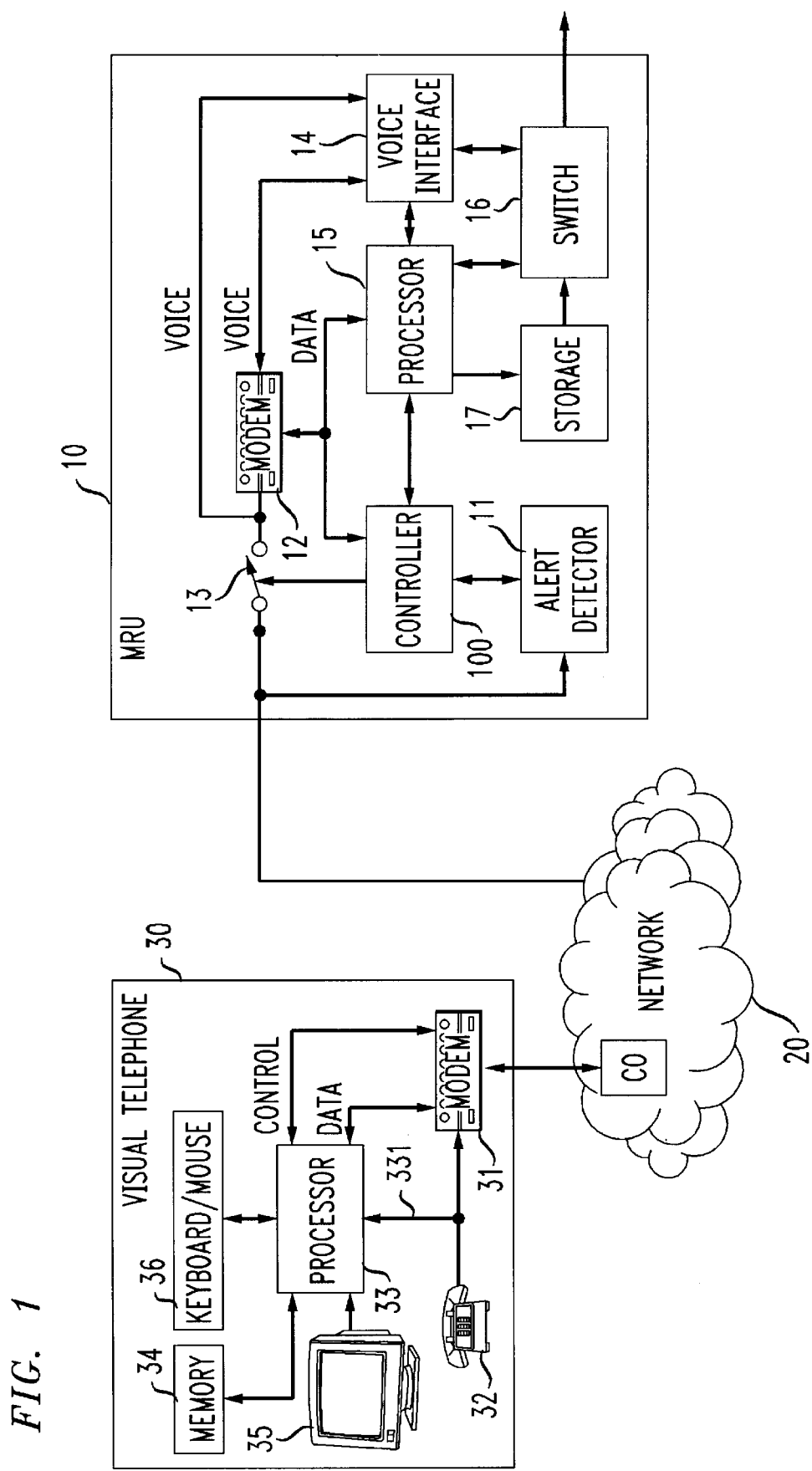
FIG. 1 presents a block diagram of an arrangement that supports a visual menu presentation to a customer premises equipment.

FIG. 1 presents an arrangement where an MRU 10 unit is connected via telecommunication network 20 to a visual telephone 30. For illustrative purposes, telephone 30 is embodied through a combination that includes a simultaneous voice and data modem 31, a conventional telephone 32 connected to the voice input port of modem 31, and a general purpose computer that includes a processor 33 that is connected to the data port of modem 31. The remaining elements of the computer are memory 34, a video display 35, and a keyboard/mouse 36 that are all coupled to processor 33. As in conventional PCs, memory 34 stores data and programs that control the operation of processor 33 as well as the information that is displayed on video display 35. Processor 33 is also coupled to a control port of modem 31, to control the modem's operations, and to the analog input of modem 31, to sense the state of the line (specifically, to determine whether conventional telephone 32 is "off hook" or "on hook"). Modem 31 is a "simultaneous voice and data" modem of the type described, for example, in U.S. Pat. No. 5,440,585 issued Aug. 8, 1995 to B. Waring Partridge, and the arrangement of conventional telephone 32 and processor 33 generally follows the disclosure in the above mentioned patent, particularly with reference to FIG. 30 therein. Modem 31 provides for two independent (logical) channels over the voice band, with one adapted for voice transmission and the other adapted for data transmission.

The combination making up visual telephone 30 can signal network 20 (e.g., dial out) both through conventional telephone 32 or through the computer. When signaling through the computer, the operation is identical to that of a conventional modem connected to computers and operating under control of communication software. For dialing out via telephone 32, processor 33 needs to detect that telephone 32 goes "off hook," cause the modem to go "off hook" in its interface to the CO in network 20, and cause the DTMF signals dialed by telephone 32 to appear at the output of modem 31. This can be achieved by simply switching the output of modem 31 to its voice input port or, alternatively, processor 33 can detect the DTMF signals emanating from conventional telephone 32 and repeat them (in proper format) to modem 31 which continues to operate in the conventional manner as described above. (It may be noted in passing that the signal on line 331 goes through an analog to digital conversion before it is processed by processor 33. The A/D board which does the conversion and which is associated with processor 33 is not shown for sake of simplicity.)

The first challenge for MRU 10 is to ascertain whether the signal it receives emanates from a CPE with a visual display that can be accessed by MRU 10, such as visual telephone 30, or emanates from a CPE that does not have an accessible visual display, such as conventional telephone 32. This challenge is readily met by MRU 10 when a hailing signal is placed by processor 33 on the data channel.

A conventional VRU includes an alert detection circuit that responds to an alert signal (e.g., ringing) on an incoming line. It informs a controller of this condition and, under command of the controller, an "off hook" condition is effected on the alerting line. The controller then activates the prompts program, and communication proceeds. The very same arrangement is created in MRU 10, with alert detector 11 coupled to the incoming line and to controller 100, which controls switch 13. The signal from switch 13 is coupled to voice interface unit 14 which is coupled to processor 15 and to switch 16 that operates under control of processor 15. Storage element 17 is coupled to switch 16 and is controlled by processor 15. In MRU 10, additional circuitry is provided to identify the type of instrument that is communicating with the MRU, and that includes a simultaneous voice and data modem 12 that is coupled to switch 13 and to controller 100. When the communicating CPE is a visual telephone 30, the data output of modem 12 contains the hailing signal sent by processor 33. The presence of this signal, detected by processor 15, clearly indicates that the MRU is communicating with a CPE which includes an accessible display. Otherwise, controller 100 concludes that the communicating CPE does not have an accessible display. The determinations made by controller 100 direct the execution of different processes.

It should be observed that the MRU allows a number of different elements to be connected in parallel to switch 13 and coupled to controller 100, each effectively tuned to a different type of CPE. Such a capability results in a very robust MRU that can be installed immediately in the telecommunication network, even before any particular communication standard is developed.

Having established a digital communication path between the CPE and the MRU, the task of providing a visual prompt menu to the CPE reduces to a selection of a protocol and of a choice and design of the menus themselves. An advantageous protocol would be one that allows response signals to emanate from both conventional telephone 32 or from processor 33 (via keyboard/mouse element 36). On the digital side, a protocol of the type used in today's Internet environment is well suited. Hyper Text Markup Language (html) is used to construct menus, and appropriate software running within processor 33 interprets and displays the menus on screen 35. By clicking on particular areas on the screen (with element 36), a signal is developed and sent to the MRU which controller 100 interprets and executes.

Figure 2:
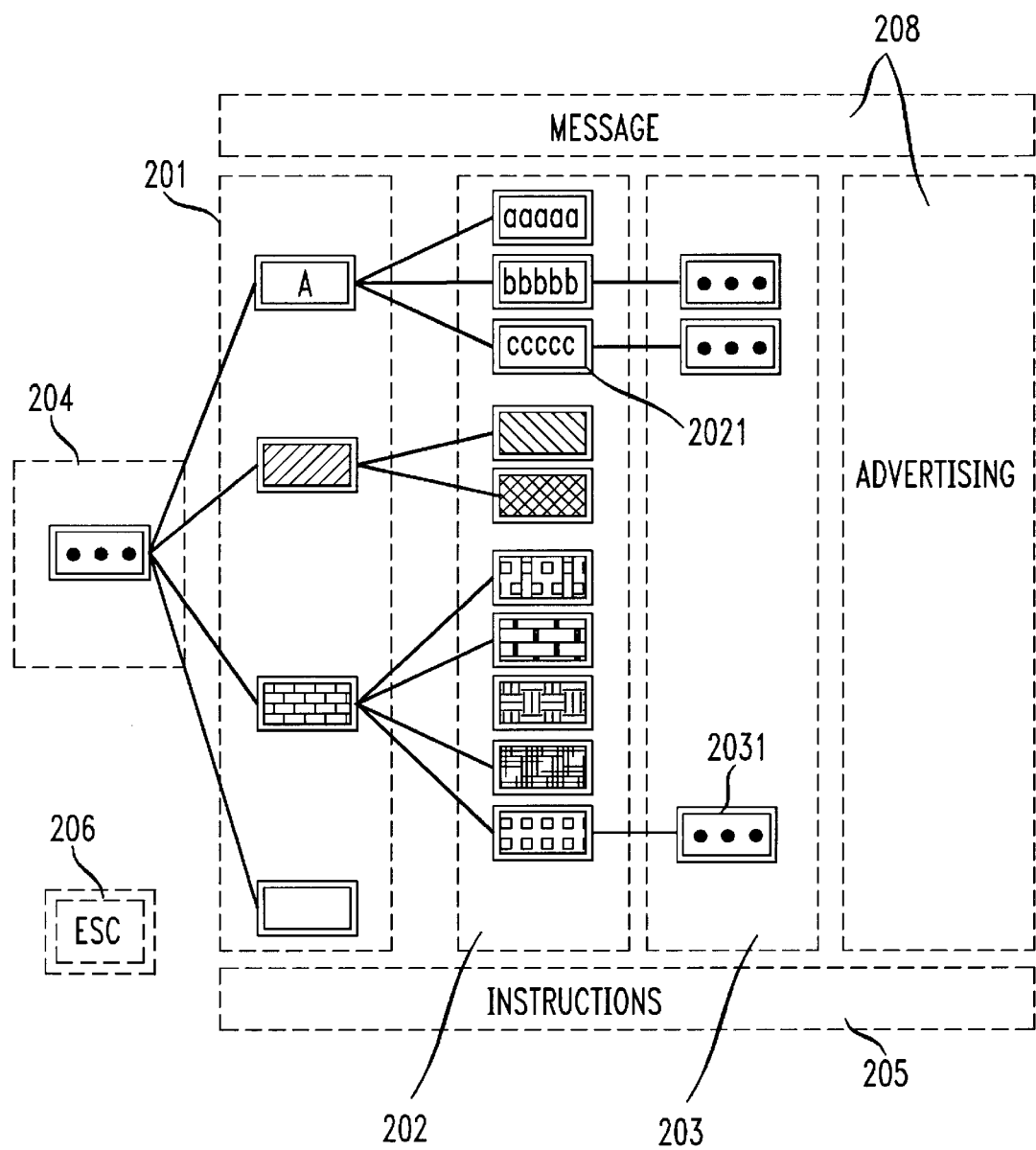
FIG. 2 illustrates a menu arrangement that comports with the FIG. 1 arrangement.

FIG. 2 presents an illustrative menu arrangement that comports with the instant disclosure as it appears on screen 35. Illustratively, the menu is hierarchical having a "top," or "root," level and subsequent, lower, levels. Area 201 is the first displayed level of choices, and area 202 is the second displayed level of choices. Area 203 follows the second displayed level and it includes indications (e.g., visual button 2031) that the associated choices in the displayed second level (indicated by a drawn line linking the two) have a lower, yet undisplayed, level of choices. Area 204, when present, indicates that a level of choices higher than the displayed first level of choices also exists. Clicking on area 204 rearranges the menu to display the higher level as the first displayed level, while the level that prior to the clicking was displayed as the first level of choices is shifted and displayed as the second level of choices. A corresponding action takes place by clicking within areas 201, 202 and/or 203. For example, clicking on visual button 2021 would cause the options in area 201 (or a subset of them or even just the option of visual button 2021) to be moved to area 201 and all options that are at the next lower level of the options displayed in area 201 are caused to be displayed in area 202.

While FIG. 2 presents a two-level menu display, it is of course understood that a single-level menu structure or a three-level menu structure are equally viable. In fact, having only area 201 displayed, as long as areas 204 and 203 are also displayed or displayable, still offers a very clear avenue for presenting hierarchical menus. Of course, if the desired entire menu can be accommodated in a single level, then areas 202–204 are not needed.

Areas 205–208 in FIG. 2 are information areas, and include messages, instruction, advertising, and the like. Those areas may be related to the menus (e.g., addressing the same or related subject matters) or may be independent of the menus (e.g., paid advertising).

Lastly, areas 205 (only one shown) correspond to links that are not menu related. For example, speaking to an operator at any point in the menu may be a very desirable option, so providing such a capability through a dedicated area 206 is quite useful. In effect, such a visual button forms an "escape" option.

As an aside, while the above speaks of "areas" it is understood that such areas can be populated by words, icons, or pictures, in a manner not unlike that currently used in Internet applications. It should also be understood that the above described structure allows effectively skipping from one branch of the hierarchical tree to another, because there need not be any limitations on what displayed item is clicked on.

Information in addition to the visual choices presented can be sent by the MRU via the voice channel. This too can comprise information/instructions that are related to the displayed menus, or can be unrelated to the menus.

As indicated above, it is advantageous to allow customers to respond via the keyboard/mouse 36 or via the conventional telephone 32. This is accomplished by having the displayed menus inform the customers how they can respond (either by speaking or by pressing a directed one of the telephone push buttons) and, at the MRU, by having processor 15 be responsive to not only the data from the digital channel but also to information from the voice channel. The path between voice interface 14 and processor 15 allows for such response menus.

Figure 3:
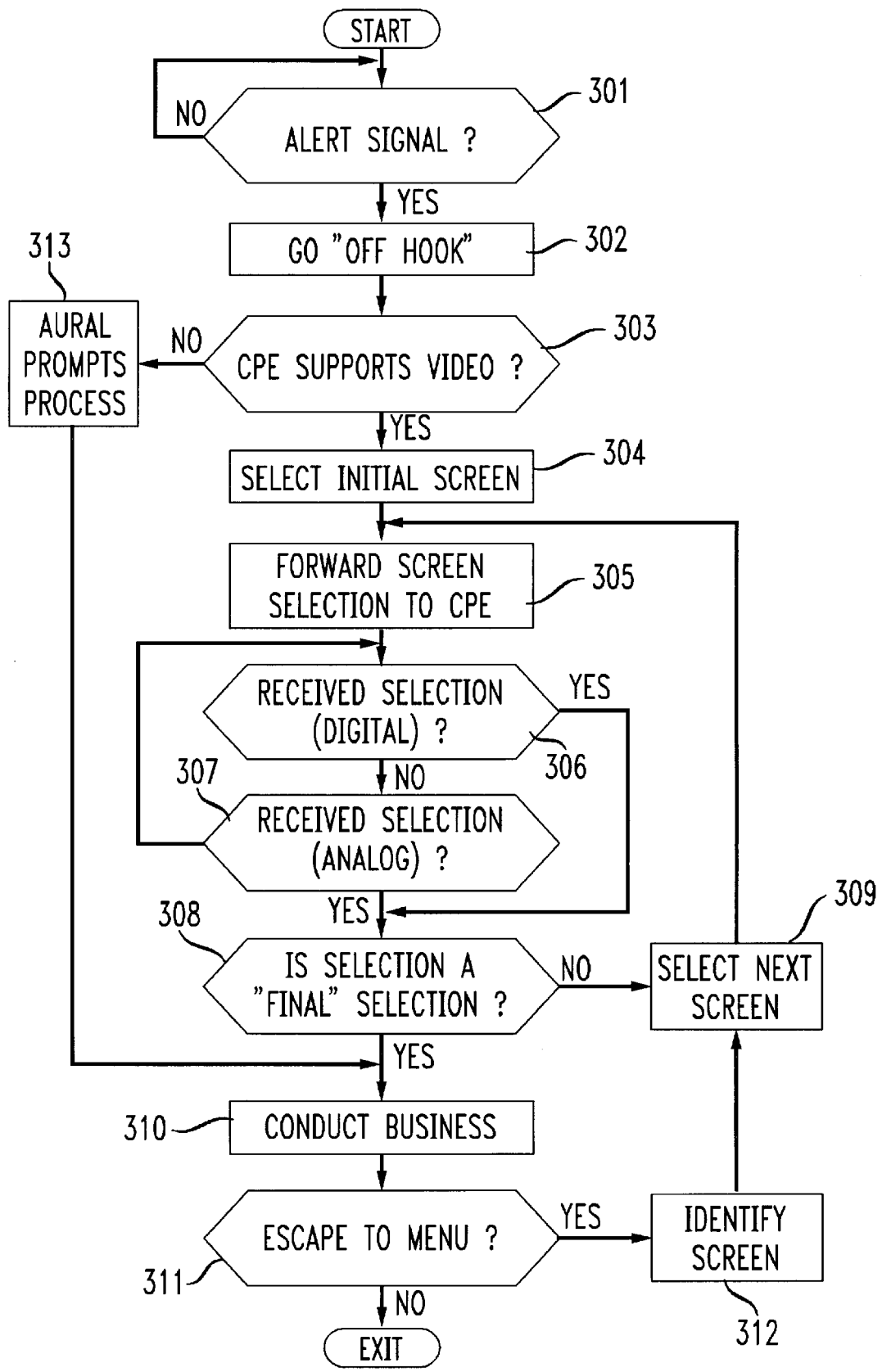
FIG. 3 provides a general flow chart of the processes carried out in the MRU.

FIG. 3 presents a general block diagram that highlights the novel processes in the FIG. 1 MRU. It begins with block 301 that detects the presence of an alert signal on an MRU's incoming line. When the alert signal is detected, control passes to block 302 causing the MRU to go "off hook" (closing switch 13 in FIG. 1). At this point, modem 12 in FIG. 1 detects the hailing signal on the incoming line, when one exists, and provides that information to controller 100. In accordance with block 303, a determination is made whether the CPE supports visual screens and control passes to block 304 when block 303 determines that the CPE does support visual screens, and to block 313 when block 303 determines that the CPE does not support visual screens. When control passes to block 313, the conventional aural prompts process proceeds, and at its conclusion control passes to block 310, where the business in connection with which the call was made to the MRU is conducted.

When control passes to block 304, an initial screen is selected by processor 15 in FIG. 1 and, pursuant to block 305, the signals corresponding to the selected screen are sent by the MRU (via modem 12 within the MRU) to the CPE. At this point, the MRU waits for a response from visual telephone 30. In accordance with the principles disclosed herein, that response can be digital or analog; that is, it can arrive at MRU 10 via the analog channel or the digital channel. Block 306 detects the arrival of responses via the digital channel. When no such responses are detected, block 307 detects the arrival of responses via the analog channel. A received response is evaluated in block 308 to determine whether it is a "final" response of the presented menu or a "non-final" response of the menu. A final response is one that informs the MRU of the specific request made by visual telephone 30. A non-final response is one that requests the MRU to provide more information, via a subsequent screen. At such a circumstance, control passes to block 309, which selects the next screen to be provided by the MRU and passes control to block 305 which forwards that next screen to the CPE.

It may be noted that block 309 functionally merely provides another screen to the CPE. In terms of what it actually does, it should be realized that it can perform two quite different actions. In the straight forward situation, processor 15 in MRU 10 of FIG. 1 changes the contents of the screen, and that change may be relatively simple. For example, the change may simply be moving that which is described in area 202 into area 201 and displaying new information in areas 202 and 203. A more interesting condition occurs when a change in display requires access to another piece of apparatus, which perhaps is another MRU. For example, assuming that the screen of FIG. 2 relates to purchasing of airline tickets, and further assuming that menu item 2021 asks the user whether he or she wishes to rent a car, a situation can occur that the CPE would select menu item 2021 or select another menu item. When such other menu item is selected, processor 15, which is part of MRU 10 that is controlled by an airline company, can create the next screen on its own. When menu item 2021 is selected, processor 15 does not have sufficient information. To obtain the necessary additional information, processor 15 can access another device (perhaps another MRU) through switch 16 and obtain the needed information to provide the display. In the alternative, processor 15 can effectively switch the call, or transfer control, to such other MRU, and have the CPE interact with such other MRU directly and obtain the screens generated by that MRU.

When block 308 determines that the selection made by the CPE is a "final" selection, control passes to block 310. FIG. 3 indicates that block 310 passes control to block 311 and that block 311 passes control to block 312. This is a diagrammatic representation of an arrangement where, during the course of conducting business, processor 15 continues to be sensitive to inputs from the CPE. When an input is received that corresponds to a CPE request to return to the menu, control is transferred from block 310 to block 311 and, therefrom, to block 312. The request to return to menu can occur when the CPE determines that an erroneous menu selection was made, can occur at the end of the business conducted (starting a new business transaction), can be initiated by the CPE, can be initiated by MRU 10 itself, or it can be initiated by equipment connected to MRU 10 via switch 16 (e.g., a telephone activated by an operator). If the transaction is completed and a request to return to the menu is not made, then the process exits.

Block 312 determines the particular screen that should be provided to the CPE and thereafter passes control to block 309. The screen selected by block 312 may be the initial screen, but it doesn't have to be. In fact, it can be dependent on the state in which block 310 was at when the escape to menu is detected.

It may be noted that since processor 15 continues to be sensitive to outputs from modem 12, the conducting of business carried out in block 310 need not be simply aural in nature. That is, it can include interactions to the screen and from the screen (assuming, of course, that the CPE supports visual screens, and processor 15 has the information to make that determination).

I claim:

1. Telecommunication apparatus responsive to an incoming call initiated by a party and arriving at a port of the apparatus, the apparatus providing aural prompts to the party that identify choices and receiving responsive signals indicative of choice selections, the improvement comprising:

a detector responsive to the incoming call;

a memory, storing signals that form at least one screen image, and the image, when displayed, shows at least two levels of a multi-level hierarchical menu structure; and a processor, coupled to the memory and to the port, supplying the screen images to said port when the detector determines that the incoming call is adapted to accept visual signals, and supplying only aural prompts when the detector determines that the incoming call is not adapted to accept visual signals;

where each level comprises menu items, where at least one level comprises a list of menu items indicative of choice selections, and where at least one menu item of at least one level represents a request to display different levels of the menu structure rather than a choice selection.

2. The apparatus of claim 1 where the screen further comprises information areas that are concurrently provided with the multi-level hierarchical menu structure.

3. A method carried out in an automated response unit that includes an aural prompt process of providing to a party that initiates a call to the unit an interaction session, where the session includes a sequence of aural prompts from the unit and corresponding responses from the party, and where each prompt suggests choices to be made and each response indicates a choice selection, the improvement comprising the steps of:

determining whether the party is communicating with the unit via apparatus that accepts visual signals;

initiating said aural prompt process when said step of determining concludes that the apparatus does not accept visual signals; and executing a visual prompt process when said step of determining concludes that the apparatus accepts visual signals, where the visual prompt process includes an interaction session that includes a sequence of presenting an image to the apparatus, and of receiving from the apparatus a signal that indicates a choice selection, where the image, when displayed, includes choices from which said choice selection is made, where the choices are displayed in a hierarchical manner, showing at least two of the hierarchical levels, and where some of the choices indicate a request to display another image to the exclusion of other actions and other choices indicate a request to take an action.

4. The method of claim 3 where the action to be taken comprises a separate visual prompt process for obtaining information from the party.

5. The method of claim 3 where the action to be taken comprises connecting the party to an operator.

6. The method of claim 5 where at any time in the course of interaction with the operator, a preselected control signal received by the automated response unit terminates the separate visual prompt process and re-executes the visual prompt process of claim 3.

7. The method of claim 3 where one of the choices presented by the image is a request to display a subsequent image and, in response to a signal from the apparatus indicating selection of this choice, the visual prompt process initiates another sequence that presents a subsequent image to the apparatus, where the subsequent image includes choices to be made, and receives from the apparatus a signal that indicates a choice selection.

8. The method of claim 3 where the image includes choices to be made and information conveyed.

9. The method of claim 8 where the information is related to the choices to be made.

10. The method of claim 8 where the information comprises additional instructions.

11. The method of claim 8 where the information comprises advertising images.

12. The method of claim 3 where at least one of the choices causes the automated response unit to connect the apparatus to a service provider unit.

13. The method of claim 12 where the service provider unit is an automated response unit.

14. The method of claim 13 where the automated response unit, in association with the connection of the apparatus to the service provider unit, instructs the service provider unit to execute a sequence comprising sending to the apparatus at least one image that includes choices to be made and receiving from the apparatus a signal that indicates a choice selection. that the incoming call is not adapted to accept visual signals.

* * * * *